US 6,886,026 B1

(12) United States Patent
Hanson (10) Patent No.: US 6,886,026 B1
(45) Date of Patent: Apr. 26, 2005

(54) METHOD AND APPARATUS PROVIDING AUTONOMOUS DISCOVERY OF POTENTIAL TRADING PARTNERS IN A DYNAMIC, DECENTRALIZED INFORMATION ECONOMY

(75) Inventor: James E. Hanson, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 09/717,856

(22) Filed: Nov. 21, 2000

(51) Int. Cl.[7] ............................................. G06F 15/16
(52) U.S. Cl. ...................... 709/202; 709/203; 709/223; 709/201; 709/224; 707/2; 707/3; 707/4; 707/5; 707/10
(58) Field of Search .............................. 707/2, 3, 4, 5, 707/10

(56) References Cited

U.S. PATENT DOCUMENTS 6,085,176 A * 7/2000 Woolston ...................... 705/37

6,418,463 B1 * 7/2002 Blevins ...................... 709/202

OTHER PUBLICATIONS

Jae–Yong Lee et al., URI directory service agent model for WWW intelligent service, Sep. 15, 1999, IEEE, TENCON 99, vol. 2, pp. 1403–1406.*

"Foundation for Intelligent Physical Agents," FIPA Abstract Architecture Specification, Feb. 15, 2000.

* cited by examiner

*Primary Examiner*—John Follansbee
*Assistant Examiner*—Ashok B. Patel
(74) *Attorney, Agent, or Firm*—Ohlandt, Greeley, Ruggiero & Perle, L.L.P.; Duane Nelson (57) ABSTRACT

A method and system for searching for software agents or directory service agents in a distributed environment. The system employs a plurality of host computers that include software agents and/or directory service agents and that are connected to a network. The method as invoked at one of the host computers searches for other agents with a recursive search that enables one agent to locate other agents that match a given criteria. The recursive search may use cross-listed directory services, negotiated cross-listings and economic considerations.

24 Claims, 7 Drawing Sheets

METHOD AND APPARATUS PROVIDING AUTONOMOUS DISCOVERY OF POTENTIAL TRADING PARTNERS IN A DYNAMIC, DECENTRALIZED INFORMATION ECONOMY

FIELD OF THE INVENTION

This invention relates generally to interconnected computers and networks and, more specifically, to computers capable of implementing autonomous and semi-autonomous software agents.

BACKGROUND OF THE INVENTION

In an economy of software agents (referred to hereafter simply as "agents"), in which autonomous agents buy and sell information goods and services to each other, it is important for agents to be able to communicate with other agents (e.g., potential customers or suppliers). Generally this requires somehow discovering an address which is used to open a communication session with that agent. It may be assumed that each agent has access to at least one directory service listing addresses of other agents.

However, under the assumption that agents and agent-hosting services are owned by a multitude of owners, each of which may define conditions under which an agent is listed, the local directory service available to an agent cannot be assumed to contain listings of all agents everywhere. Furthermore, it is clearly possible that the directory service is not a part of any well-ordered hierarchy which may be exhaustively searched. Furthermore, since the population of agents and the services they offer constantly change, no static scheme of registration is feasible over any significant period of time.

Initially, the problem appears to be similar to any number of problems encountered in distributed systems, in which remote resources must be located. One familiar example of this is the problem of locating machines on the internet by name. This problem is solved using DNS, a hierarchical mapping scheme in which machine names are mapped onto IP addresses. In general, as in DNS, solutions to these problems assume a structure or regularity that the context of this invention does not permit. For example, in the context of most interest to the instant invention: (1) there is no universal hierarchy of directory services; (2) there is no centralized or hierarchically managed directory system listing all agents everywhere; and (3) directory services are under the control of independent agents, i.e., a directory service has the option of refusing to cross-list or of refusing to provide listings.

In another context so-called spiders or web-crawlers perform recursive searching over the World Wide Web (WWW) in order to locate a page that satisfies some search criteria, i.e., a page that has text or some other content that matches some specified pattern. The Web itself has the same disordered, open structure that an agent economy has, and indeed, one element of the present invention is a recursive search step. However, Web crawlers make use of recursive search to obtain, for a human user, Web pages that match some previously given search criteria, and do not enable an agent to find other agents with which the agent may interact in some way, such as buying or selling information, goods and/or services. Also, in general Web crawlers have a limited level of autonomy and decision-making capabilities.

Reference can also be had to a draft document entitled "FIPA Abstract Architecture Specification" (FIPA refers to Foundation for Intelligent Physical Agents), FIPA Document number PC00001, dated Feb. 15, 2000, in particular Section 3.2 "Directory Services", which describes FIPA's specification of a directory service and how it functions. In this document an agent is enabled to locate agents with which to communicate by the use of an ontology (e.g., "org.fipa.ontology.stockquote"), and to retrieve from a directory service one or more directory entries for other agents that support the ontology. With regard to finding a FIPA-service, an agent, agent-platform or other FIPA-service can issue a query to a directory service to retrieve matching directory-entries, which the requesting agent can review.

Given the limitations of the prior art, there exists a need for a method whereby agents may locate one another despite the absence of any centralized directory service or of any orderly hierarchy of directory services.

OBJECTS AND ADVANTAGES OF THE INVENTION

It is a first object and advantage of this invention to provide an improved method and apparatus to enable an agent to locate another agent.

It is another object and advantage of this invention to provide a method and apparatus to implement a recursive search to enable an agent to locate another agent matching a given set of search criteria, using cross-listed directory services, where a directory service may be local to the initiating agent, or where the directory service may be queried as part of a recursive search initiated by some remote agent.

It is another object and advantage of this invention to provide a method and apparatus to implement a recursive search to enable an agent to locate another agent matching a given set of search criteria, wherein the recursive search is performed by the agent that initiated the search, whereby the local agent queries a local directory service for listings of other directory services.

It is a further object and advantage of this invention to provide a method and apparatus to implement a recursive search to enable an agent to locate another agent matching a given set of search criteria, wherein the recursive search is performed by a directory service in response to a query from an initiating agent, where the local directory service first searches its own database for agents matching the given criteria, then searches its own database for other directory services, then launches a recursive search.

It is another object and advantage of this invention to provide a technique whereby directory services may cross-list.

SUMMARY OF THE INVENTION

The foregoing and other problems are overcome and the foregoing objects and advantages are realized by methods and apparatus in accordance with embodiments of this invention.

The teachings of this invention fulfil the foregoing and other needs by providing software agents with a means whereby an agent, acting in conjunction with directory services, may embark on searches for other agents in the context of an open, disordered, dynamic population of agents and directory services. More particularly, this invention provides a method for locating agents in an open, dynamic environment lacking any central, universal, or hierarchical registration scheme.

This invention presupposes the existence of at least one "directory service" (DS) agent, to which search requests may be sent. The invention includes at least two interrelated parts: a recursive search of cross-listed DSs; and a negotiated cross-listing of DSs. These are described in turn below.

1. Recursive search of cross-listed DSs: A software agent, when making a request to a DS agent for listings matching given criteria, may also query the DS agent for listings for other DSs agents. On receiving listings of other DSs, the software agent may send the original search query to them, and/or may request them for still other DSs for further querying. At each step in this process, the software agent may elect to terminate the search, based on termination criteria which may include one or more of the cost (in time or in money) of the search, the number of hits already found, or other criteria. It may also be the case that the agent directs its requests for DSs to a different agent than its requests for agents matching the original search criteria. Thus, there may exist "meta-DS" directory services that only or primarily carry listings of DSs. At each step in the search, the DS involved may elect to provide the requested listings (of other DSs or of agents matching the original search criteria), or it may provide a subset of them, or it may refuse to provide them at all. The DS may charge a fee to provide a requested listing. The DS may also provide information only to agents meeting certain criteria such as, but not limited to, agents that have subscribed to the DS, or agents that are within an intranet that contains the DS. A DS may, in response to a search query, embark on its own recursive search, and provide the listing collected in the course of the search to the agent making the original search query.

2. Negotiated cross-listing of DSs. In this case one DS (DS1) may solicit listings from another DS (DS2), and if DS2 consents, then a listing for it is placed with DS1. Or DS1 may request to place its own listing with DS2. A third possibility is for one DS to place a listing with another DS (e.g., a meta-DS as above), and for a third DS to receive the address information of that DS as part of a recursive search. In response to an invitation from DS1 to place a listing, DS2 determines whether to accept or refuse the invitation based on its own criteria. These criteria may include one or more of the following:

1. Capacity considerations, for example, whether DS2 already has enough business, since a cross-listing will most probably generate more;
2. Security considerations, for example, whether agents in the DS's cluster (for example, an intranet domain or, more generally, any security firewall or barrier) are permitted to connect out-of-cluster; and
3. Economic considerations, for example, whether the income expected from cross-listing outweighs the cost of the cross-listing.

Similar considerations apply for the case where DS1 makes a request to place a listing with DS2. In this case DS2 may refuse, or, upon providing fee information to DS1, DS1 may cancel its request. The same considerations apply to the meta-DS case.

The software agents in accordance with the teachings herein have a degree of autonomy and are capable of some decision-making capability. For example:

1. The decision of whether to cross-list is under the autonomous control of a directory service agent, which may make its decisions in any way, including on a case-by-case basis. Cross-listing is preferably negotiated online by the two directory services involved and, in the preferred embodiment, only occurs if both agents consent.
2. The decision of whether a directory service provides an agent with requested listings is made by the directory service agent, which may make it decisions in any way, including on a case-by-case basis. Access is preferably negotiated online by the two agents involved.
3. The choice of whether and how much searching to perform is under the control of the agent requesting the search. The agent may optionally apply control criteria such as, but not limited to, trading off resources spent in searching vs. the expected value of a listing. In the preferred embodiment this aspect of the invention requires mutual consent by all involved agents.

A further aspect of this invention relates to various manners in which directory service agents may cross-list. In one embodiment the directory services can be "hardwired", that is, a directory service is configured with locators or addresses of other directory services. In another embodiment a Push operation is employed, where one directory service attempts to place an ad (place a listing) with another, already-known, directory service. In another embodiment a Pull operation is employed, where one directory service invites another, already-known, directory service to place an ad (place a listing) with it. A still further embodiment of this invention provides a matchmaker or meta-directory function, wherein one directory service may contact a known directory-of-directories (meta-directory) and place an ad and/or request listings of other directory services.

Refinements to the recursive search aspects of this invention include prioritizing which DSs to search based on previous experience with them, and/or on other considerations, as well as search termination based on conditions such as cost and/or efficiency.

This invention pertains to a data communications system that includes a communications network that couples together processor nodes, as well as to methods of operating the nodes. Certain ones of the processor nodes execute a program for implementing the functionality of at least one of a software agent or a directory service agent. The program operates so as to initiate a search procedure for at least one of other software agents or directory service agents, to determine whether to query a current directory service agent for a list of other software agents that match at least one search criterion and, responsive to determining to query the current directory service agent, to query the current directory service agent for the list of other software agents that match at least one search criterion. The program adds any new matching software agents to a list of matching software agents, determines whether to query a current directory service agent for a list of other directory service agents and, responsive to determining to query the current directory service agent for a list of other directory service agents, queries the current directory service agent for the list of other directory service agents. The program then adds any new directory service agents to a list of directory service agents and selectively one of terminates the search procedure or selects from the list of directory service agents another directory service agent as the current directory service agent, and recursively continues the process until the search procedure is terminated.

A cross-listing mechanism is also provided for the case where there are a plurality of directory service agents. In one case a first directory service agent contacts, through the communications network, a second directory service agent with a solicitation to list the second directory service agent and the second directory service agent accepts or refuses the solicitation, where an acceptance includes sending listing information. In another case the first directory service agent contacts the second directory service agent with a request to be listed by the second directory service agent, and the second directory service agent accepts or refuses to list the first directory service agent. An indirect case is also presented, where initial contact is made through a third directory service agent.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 7:
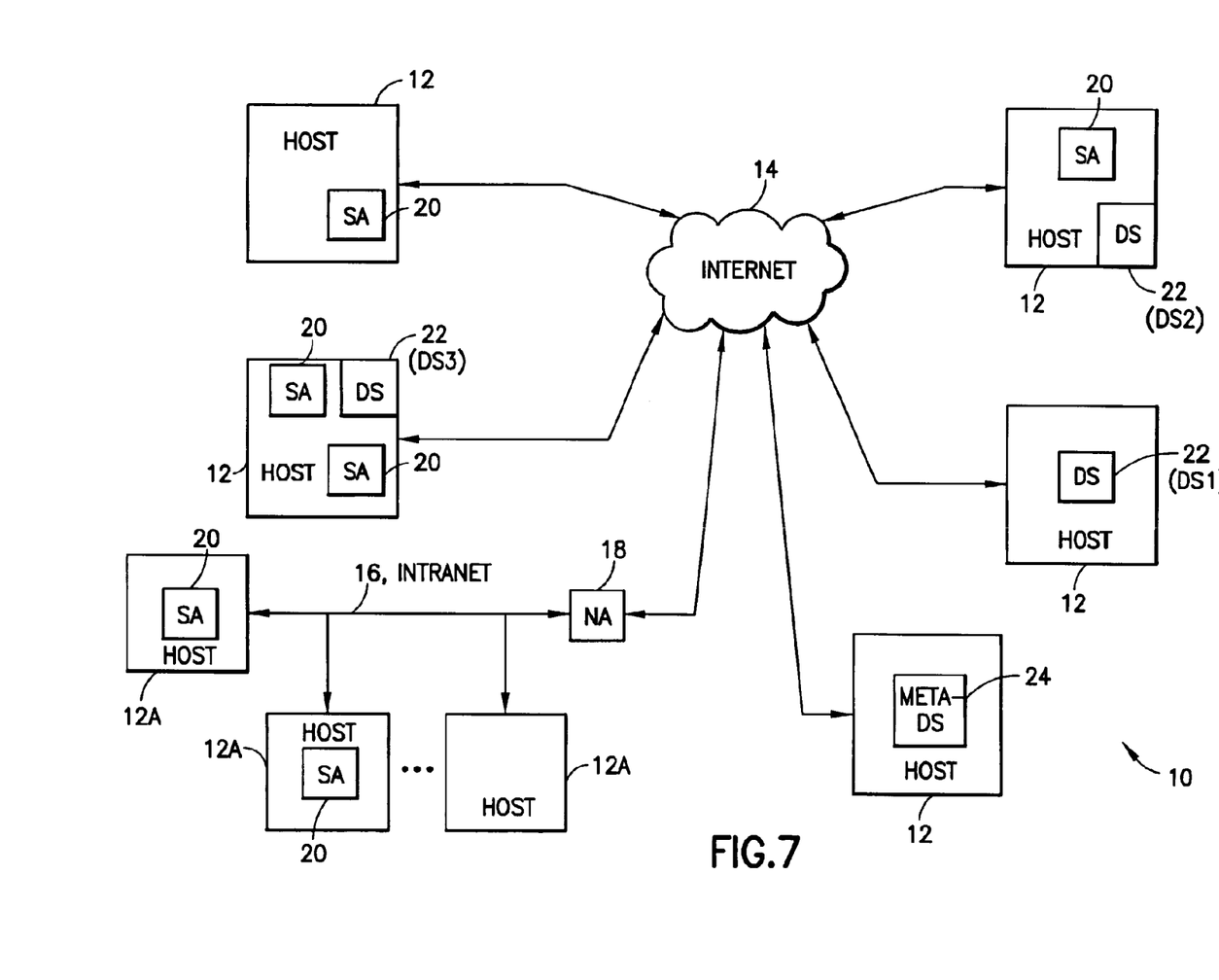
FIG. 7 is a simplified block diagram showing a network environment wherein software agents and directory services reside and interact in accordance with the teachings of this invention.

Reference is first made to FIG. 7 for illustrating a network 10 that is suitable for practicing this invention. The network 10 includes a plurality of processing nodes, referred to as hosts 12, which may be embodied as personal computers, portable computers, information appliances, main frame computers and, in general, any data processing platform suitable for executing program instructions for implementing one or more software agents (SA) 20 and/or directory service (DS) agents 22. One or more meta-DS agents 24 may also be provided. The various hosts 12 can be interconnected via the Internet 14 and, as such, each will typically have a network address through which its associated software agent 20 and/or directory service agent 22, 24 can be reached. The addresses can be, by example, TCP/IP addresses or, if http is used, a uniform resource locator (URL). Other hosts 12A may be interconnected via an Intranet 16 which in turn is connected to the Internet 18 through a suitable network adapter (NA) 18. The Intranet-connected hosts 12A may also include one or more of the software agents 20, as well as directory service agents 22 and meta-DS agents 24 (not shown).

It should be noted at the outset that it is not necessary that one host 12 be associated with one SA 20 or with one DS agent 22. In fact, one host 12 may be associated with any number of SAs 20, DS agents 22 and/or meta-DS agents 24, each with its own "address" in some agent addressing scheme. It may also be the case that one agent (20,22,24) may be associated with more than one host 12. However, in these various cases there is assumed to be one agent per address. Furthermore, any one particular agent may combine DS agent, meta-DS agent and/or service agent capabilities.

It should also be appreciated that the specific network type(s) and network topography are not critical to the operation of this invention, so long as distributed software agents 20 and directory services agents 22 are enabled to communicate with one another through some messaging scheme and (optional) message acknowledgment scheme.

Individual ones of the software agents 20 may be considered as autonomous or semi-autonomous programs that locate other specified types of software agents 20, and that employ the DS agents 22 and optional meta-DS agents 24 as described below. As but one example, assume that one of the hosts 12 is associated with an enterprise that seeks to buy a commodity, such as crude oil. The associated SA 20 is constructed to attempt to locate other software agents 20 having one or more characteristics or attributes that match some predetermined search criteria (e.g., crude oil wholesaler, crude oil producer, etc.) The actual functionality of the software agents 20 can vary from embodiment to embodiment. For example, at a simplest level the software agent 20 may simply return contact information for located software agents that match the search criteria so that another program, or a human operator, can make contact and attempt to negotiate a purchase. In other embodiments the software agent 20 may have more functionality and may be capable of not only locating other software agents, but may also actively attempt to negotiate terms and conditions for the purchase and delivery of crude oil from the located software agent(s), assuming that they have this functionality and authorization. The particular operational functional characteristics and attributes of the software agents 20, beyond the functionality that is described below in connection with the teachings of this invention, is not particularly germane to an understanding of this invention.

The various DS agents 22 maintain a directory or list of software agents 20, while the (optional) meta-DS agent(s) 24 maintains a directory or list of directory service agents 22. The directory or list of software agents 20 contain, as a minimum, information that is descriptive of a contact address for at least one software agent, such as a network address, as well as information that is descriptive of the functionality or purpose of the software agent 20, against which search criteria can be compared (e.g., "crude oil wholesaler"). The functionality of these various directory agents 22, 24, and their interactions with one another and with the service agents 20, is described in detail below.

Figure 1:
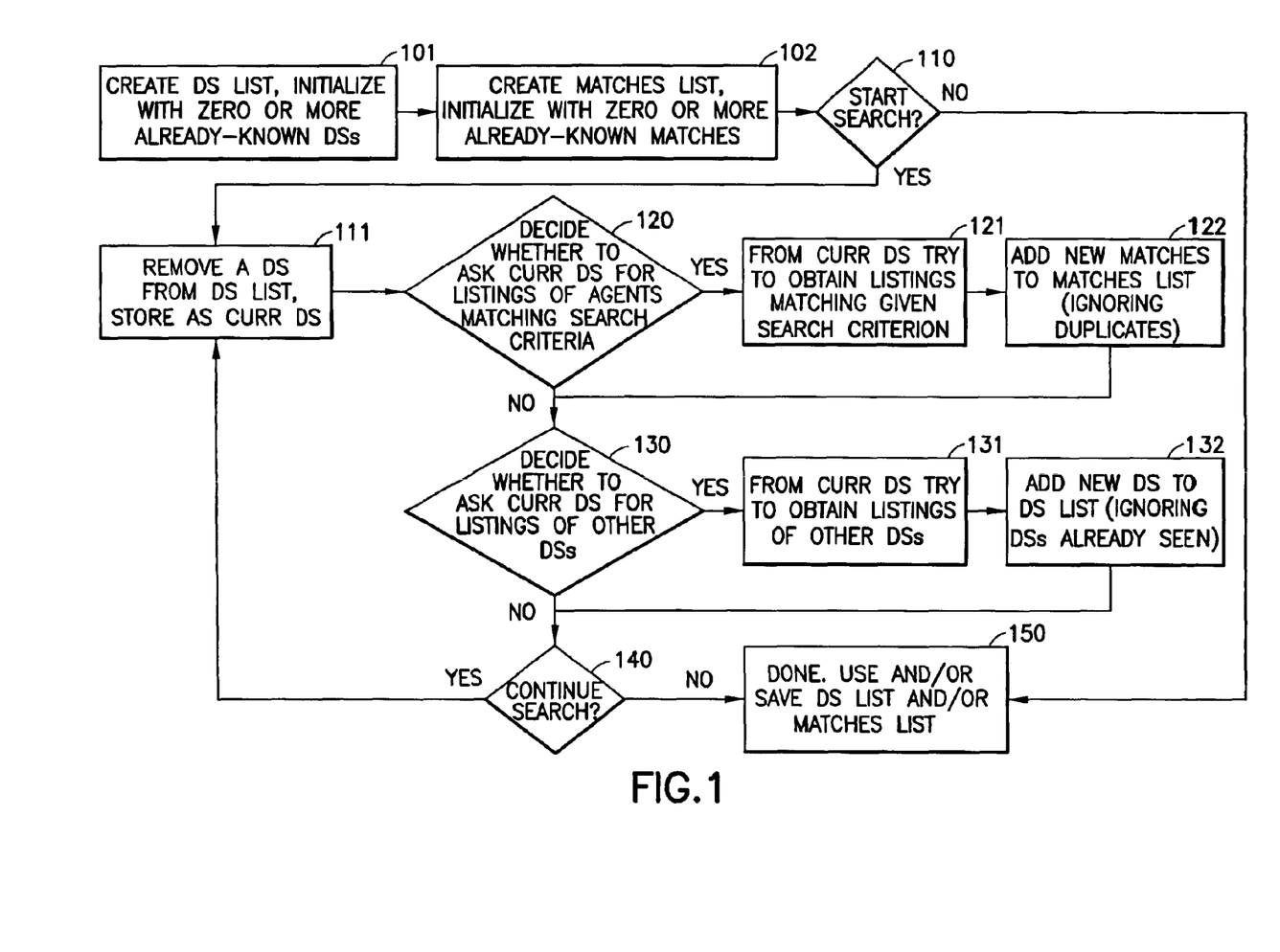
FIG. 1 is a logic flow diagram that depicts the processing of an agent that initiates a combined recursive for agent listings matching some criterion and for directory service agents.

FIG. 1 shows the processing of a software agent 20 that initiates a combined search for other software agent listings that match some criterion and for directory service agents 22. In steps 101 and 102, the SA 20 creates and initializes a set of agent listings matching the search criterion or criteria (denoted matchesList) and a set of DS agent listings (denoted DSList). Each listing in the two sets contains, at a minimum, information sufficient to allow the requester agent to communicate with the listed agent. The information may comprise a network address, such as a TCP/IP address or a URL. Optionally, the listing may contain additional information which may be relevant to the search process, such as information concerning desirable or undesirable properties of the listed agent that can be used to evaluate whether to contact that agent.

If the requestor agent is a DS agent 22, then it may use the agent listings that it itself carries as the source of this initialization data. The requestor agent, whether a DS agent 22 or a software agent 20, may also use other sources of information, such as results obtained in previous searches, default directory services supplied by a runtime environment, information obtained from previous contact with other agents, information entered manually by human users and, in general, information obtained from any suitable source.

In the preferred embodiment a non-DS agent 20 initializes its DSList with the default DS supplied by the runtime environment and leaves matchesList empty. For a DS agent 22, the preferred embodiment initializes its matchesList and DSList with all appropriate entries from its own listings.

In step 110, the requestor agent makes a decision whether to start the search. This may be based on current contents of matchesList and DSList, available resources such as funds to pay for listings, CPU time, etc., resources spent so far, and other factors. For example, if DSList is empty, then it is not possible to execute step 111, and the search may not be started.

In step 111, a DS is selected from DSList. If there is more than one DS in DSList, the selection may be made according to any criterion: e.g., at random, in the order in which it was added to DSList, or by some criterion applied to the DSs, such as name, location, or prior experience. The selected DS is removed from DSList and stored as currDS.

In step 120, the agent decides whether to request listings of potential matches from currDS. This decision may be based on one or more of a number of criteria, such as the current contents of matchesList, on known information concerning currDS, on resources so far expended on the search, on available resources, and so forth. If the decision is made to request the currDS for matches, the method proceeds to step 121, otherwise the method proceeds to step 130.

In step 121, the agent contacts the currently selected DS 22 (currDS) and attempts to obtain from it listings of software agents 20 matching the search criterion. This interaction may involve negotiations between the requestor agent and currDS, and currDS may refuse to provide the listings, even if it has listings. It may also charge a fee and/or require that the requester subscribe, or impose other conditions for providing the listings. Further by example, currDS may offer to provide a selection of listings based on, by example, the amount paid or some other condition. The requester agent may accept or may refuse to meet currDSs conditions. At the end of step 121, the requestor agent has obtained zero, one, or more listings (denoted "matches") from currDS.

In general, it should be noted that the relationship between software agents 20 and directory service agents 22 may involve some type of subscription arrangement, in lieu of or in addition to charging a fee per use.

In step 122, the requester agent adds the matches just obtained to matchesList. If any of the new matches are already found in matchesList, that new match is not added a second time. Optionally, the requestor agent may attempt to double-check that the matches do indeed match its search criteria before adding them to matchesList. This latter case may not always be possible to realize if, for example, the DS 22 does not always provide all of the information that it used to establish the match.

At step 130 the agent makes a decision whether to query currDS for names of other DSs. This decision can be based on factors such as (but not limited to) the following:
a. Number of listings already in matchesList
b. Characteristics of the listings already in matchesList
c. Amount of money, time, effort (CPU time) or other resources already expended on the search.
d. On available resources.
e. Number of DSs that have already been used.

If the decision in step 130 is to request currDS for listings of other DSs, the requestor agent goes to step 131. If not, it goes to step 140.

In step 131, the requestor agent sends a request to currDS for listings of DSs. As in step 121, this may involve negotiation between the requestor agent and currDS, and/or it may involve paying a fee, subscribing, or meeting some other condition(s). At the end of step 131, the requestor agent has obtained zero or more listings of other DSs from currDS.

In step 132, the listings of new DSs, obtained from currDS, are added to DSList. Preferably, no DS that has already been contacted is added to DSList, and no DS that is already in DSList is added a second time.

In step 140, the requester agent decides whether to continue the search. One important criterion is that DSList be non-empty. Other criteria include the considerations of resources spent and resources available, as discussed above.

If the decision is to stop, the search is ended, as is indicated by step 150.

In FIG. 1, it is evident that the search for matching agents 20 and the search for other DS agents 22 need not both be done, or need not be done together. This is illustrated in FIGS. 2 and 3.

Figure 2:
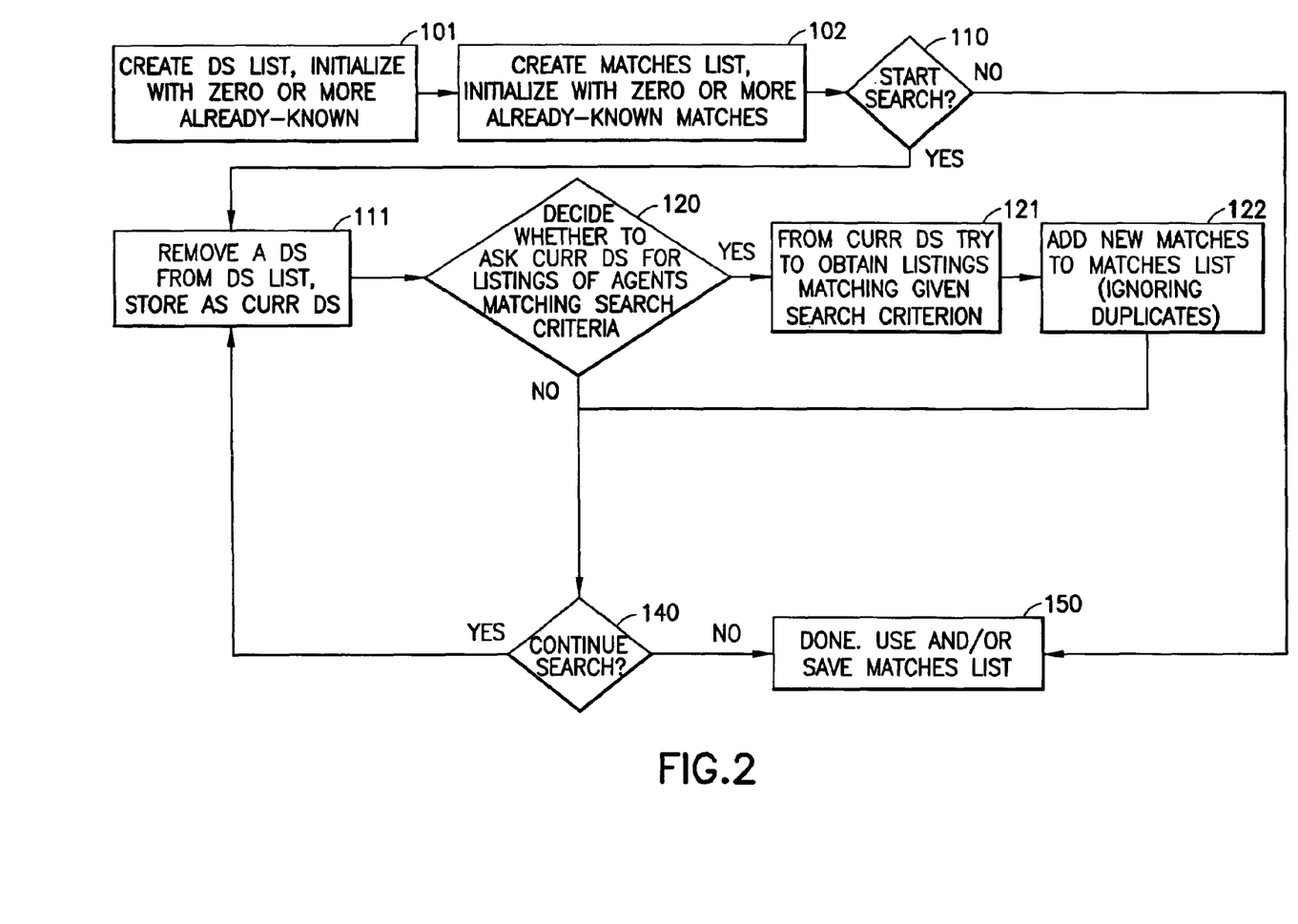
FIG. 2 shows the method of FIG. 1 modified to search for agents matching a search criterion using a fixed DSList.
Figure 3:
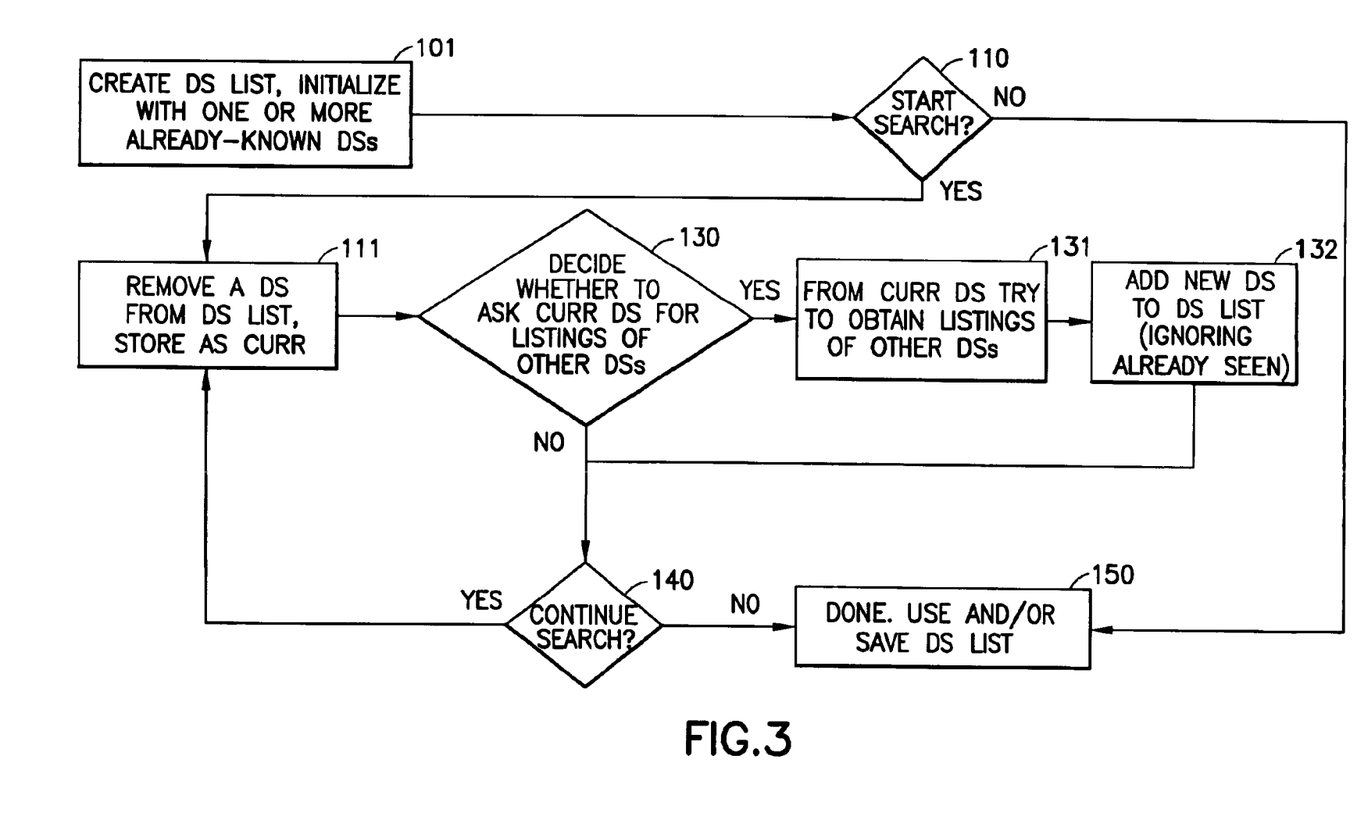
FIG. 3 shows the method of FIG. 1 modified to only search for other DSs.

FIG. 2 shows the method of FIG. 1 modified to search for software agents 20 matching the search criterion using a fixed DSList, while FIG. 3 shows the method of FIG. 1 modified to only search for other DS agents 22. Note in FIG. 2 the steps 130, 131 and 132 are omitted, while in FIG. 3 the steps 120, 121 and 122 are omitted.

Figure 4A:
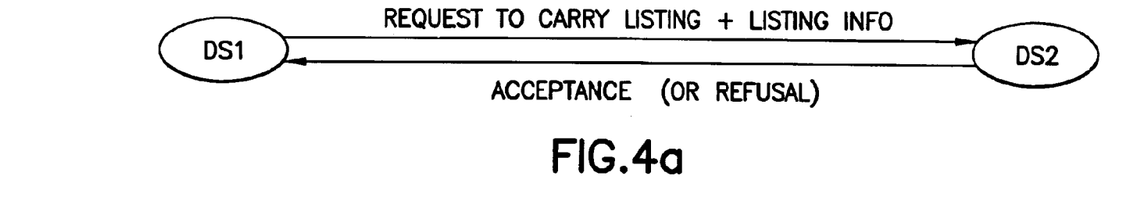
FIGS. 4A, 4B and 4C depict various techniques by which DS agents may cross-list, specifically a Push, Pull and an Indirect technique, respectively.

FIG. 4 depicts various techniques by which DS agents 22 may cross-list. More specifically, FIG. 4A shows a Push, where DS1 attempts to place an ad with DS2 (see as well FIG. 7). It is assumed that DS1 already has knowledge of how to contact DS2.

Figure 4B:
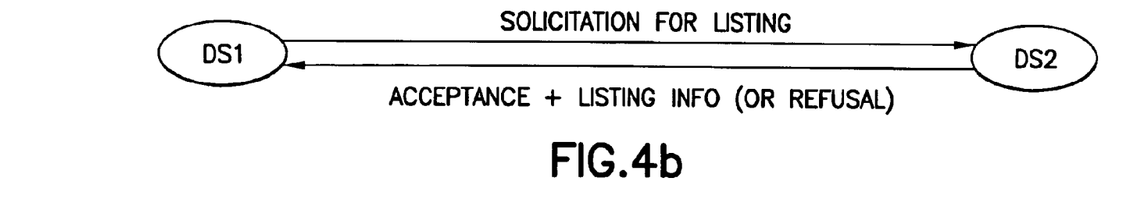
Figure 4C:
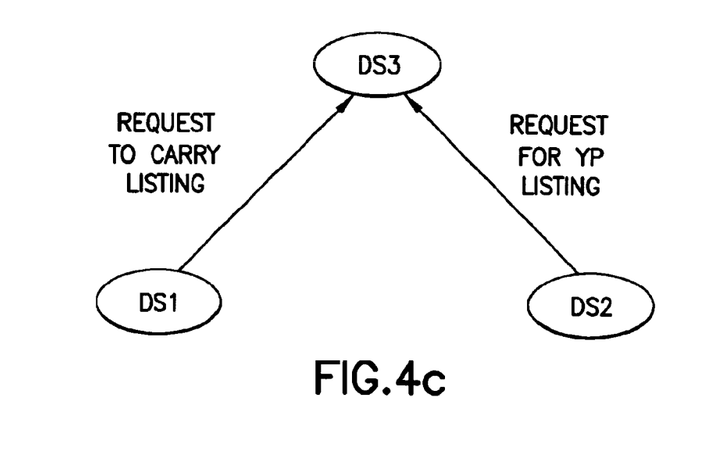

FIG. 4B shows a Pull, where DS2 invites DS1 to place an ad with it. It is assumed for this case as well that DS2 already has knowledge as to how to contact DS1. FIG. 4C shows an Indirect technique, where DS1 places an ad with DS3. At some later time, DS2 obtains DS1's listing by requesting listings of DSs from DS3. As is evident, the Indirect cross-listing mode of FIG. 4C is a combination of "push" from DS1 to DS3 with recursive search for DSs by DS2, in which DS3 is queried. It should also be evident that any DS may use any or all of the indicated cross-listing modes in any combination. Furthermore, other combinations of push and pull, involving two or more DSs, may be derived by those skilled in the art, when guided by the foregoing teachings.

Figure 5:
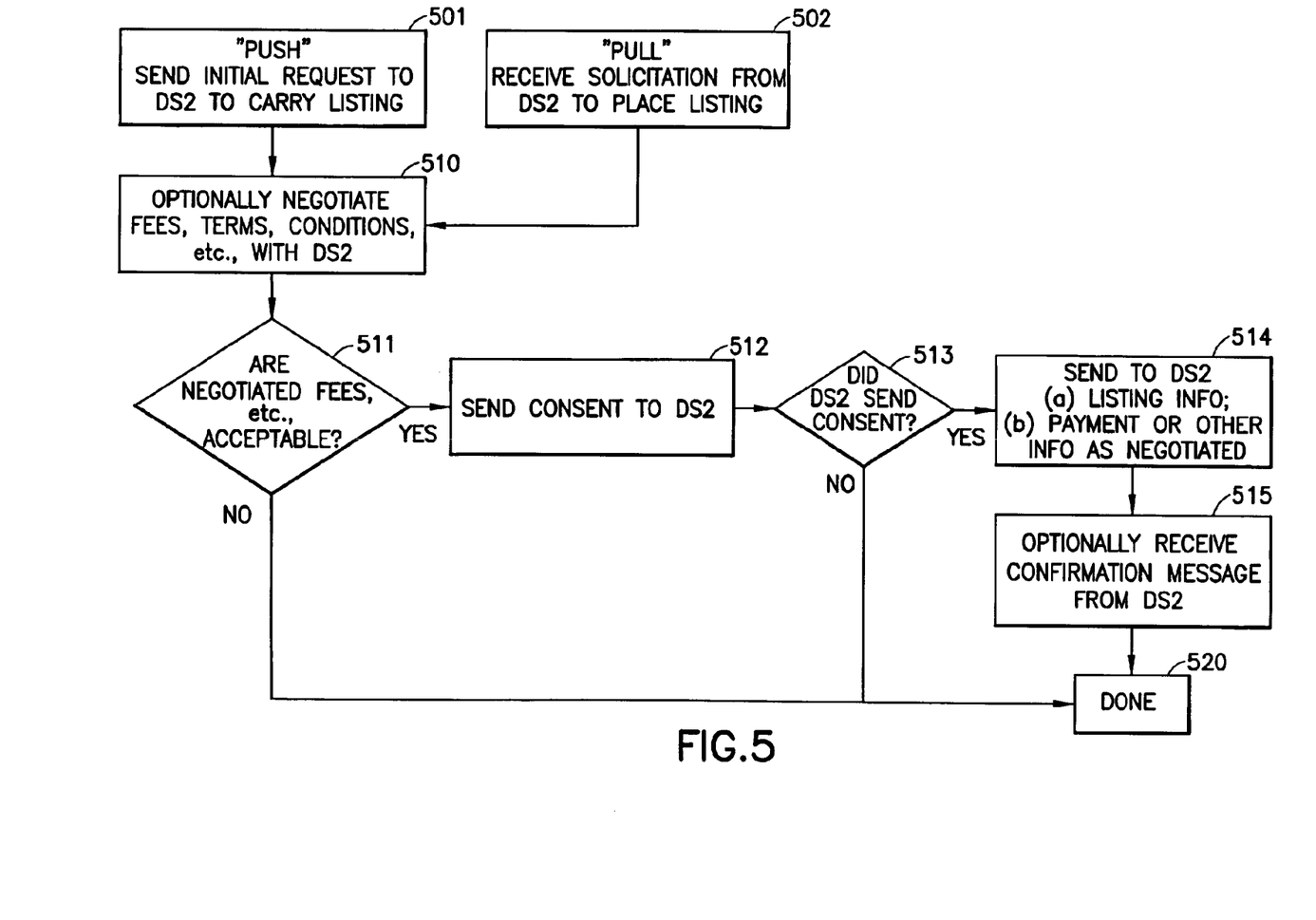
FIG. 5 illustrates the processing of DS1, as indicated in FIGS. 4A and 4B.

FIG. 5 is a logic flow diagram that shows the processing of DS1 as indicated in FIGS. 4A and 4B. The processing of DS1 as indicated in FIG. 4C can be readily inferred based on the disclosure of FIG. 5. The processing of a cross-listing in "push" mode begins in step 501, in which DS1 sends one or more messages to DS2, requesting that DS2 carry a listing of DS1. Processing in "pull" mode starts in step 502, when DS1 receives from DS2 one or more messages in which DS2 solicits DS1 to place a listing with DS2. Both steps 501 and 502 lead to optional step 510, in which DS1 negotiates with DS2 concerning the listing. Such negotiations may concern fees that are charged and other terms and conditions, such as what the listing may contain and how long it is to be carried, a specification of the format to which the listing must conform, any keywords or ontologies that it may use, and other factors. Note should be made that this may be equally true for the SAs 20 listing with DSs 22. The negotiations may also concern options in the way in which requests (from other agents) that match the listing are to be handled. For example, DS2 may charge a premium in return for placing DS1's listing in a prominent position, or providing it to requestor agents at a reduced fee, etc.

At the end of the negotiation process, in step 511, DS1 assesses whether the resultant "deal" is acceptable to it. If so, it informs DS2 of its consent (step 512). Then, if it receives the corresponding consent from DS2 (step 513), it sends the listing information to DS2, along with any fees or other negotiated information (step 514).

As part of step 514, DS1 may receive notice from DS2 that it has not sent the proper information or has not sent the listing information in the required format. This may be followed by a "conversation" between DS1 and DS2 that results in DS1 sending what is required. DS1 may also receive a separate confirmation from DS2 (step 516) to indicate that DS1's listing has been successfully placed.

It should be noted that, in general, any message sent from one agent to another may be followed by a receipt or confirmation sent back in reply. This is equivalent in certain respects to various types of mail: e.g., request for a delivery receipt, request for acknowledgment. In any event, any or all of the various message passing operations described above may be assumed to include some type of acknowledgment (ACK) process. These ACK processes can relate to one or more of the following considerations.

1. Message delivery. The sender agent can receive back a confirmation that the message was delivered, or can receive an error message if delivery failed, or receive nothing (no ACK).
2. Message comprehension. The sender agent can receive a confirmation that the recipient was able to recognize what the message was and was able to parse it successfully, or the sender agent may receive an error message, or receive nothing.

In either case, if the confirmation fails to arrive the sender of the message can resend the message, possibly modified. Those skilled in the art will realize that a well-designed error message can provide hints as to how the message should be modified in order to be deliverable or comprehensible.

Figure 6:
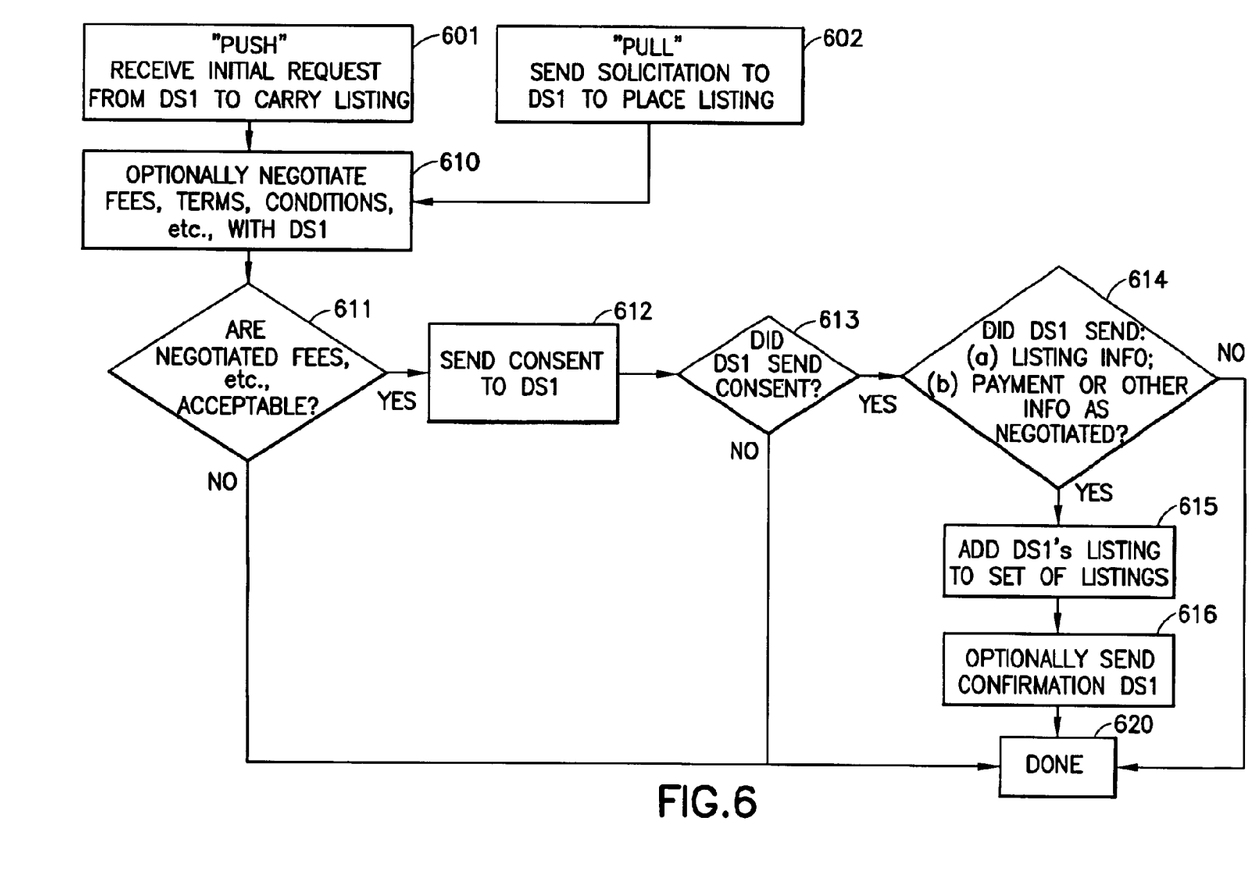
FIG. 6 illustrates the processing of DS2, as indicated in FIGS. 4A and 4B.

FIG. 6 shows the inverse of FIG. 5: i.e., the processing of DS2 as indicated in FIGS. 4a and 4b. In step 601, as the start of a "push", DS2 receives a request from DS1 to carry DS1's listing. A "pull" starts in step 602, in which DS2 sends a solicitation to DS1, inviting DS1 to place a listing with DS2. Both steps 601 and 602 are followed by step 610, in which DS2 carries on its side of the negotiations described for FIG. 5, in step 510.

If the outcome of the negotiation is acceptable (step 611), DS2 sends its consent to DS1 (step 612). If DS1 also sends its consent (step 613), and follows its consent with its listing and other information (step 614), then DS2 adds the listing information of DS1 to its set of listings.

As part of step 614, DS2 checks whether DS1 has sent the listing and other information in the form it requires. If the received listing information is not complete or in the proper form, DS2 may engage in a conversation with DS1 in order to obtain what it needs. After receiving the information, DS2 then may optionally send back a confirmation that it now carries DS1's listing.

While the invention has been particularly shown and described with respect to preferred embodiments thereof, it will be understood by those skilled in the art that changes in form and details may be made therein without departing from the scope and spirit of the invention.

What is claimed is:

1. A method for operating a software agent, comprising steps of:

initiating a search procedure;

determining whether to query a current directory service agent for a list of other software agents that match at least one search criterion;

if it is determined to query the current directory service agent, querying the current directory service agent for the list of other software agents that match at least one search criterion;

adding any new matching software agents to a list of matching software agents;

determining whether to query the current directory service agent for a list of other directory service agents;

if it is determined to query the current directory service agent, querying the current directory service agent for the list of other directory service agents;

adding any new directory service agents to a list of directory service agents; and selectively one of terminating the search procedure or selecting from the list of directory service agents another directory service agent as the current directory service agent, and repeating the steps of determining, querying and adding.

2. A method as in claim 1, wherein if it is determined not to query the current directory service agent for the list of other software agents, the method instead executes the step of determining whether to query the current directory service agent for the list of other directory service agents.

3. A method as in claim 1, wherein if it is determined not to query the current directory service agent for the list of other directory service agents, the method instead executes the step of selectively one of terminating the search procedure or selecting from the list of directory service agents another directory service agent as the current directory service agent.

4. A method as in claim 1, wherein the step of determining whether to query a current directory service agent for a list of other software agents considers at least one of a current content of the list of matching software agents, on information concerning the current directory service agent, on resources so far expended on the search, and on available resources.

5. A method as in claim 1, wherein the step of determining whether to query a current directory service agent for a list of other directory service agents considers at least one of a current content of the list of matching software agents, characteristics of the entries in the list of matching software agents, on resources so far expended on the search, on available resources, and on a number of directory service agents that have already been queried.

6. A method as in claim 1, wherein the step of querying the current directory service agent for the list of other software agents comprises an initial step of attempting to negotiate acceptable terms with the current directory service.

7. A method as in claim 1, wherein the step of querying the current directory service agent for the list of other directory service agents comprises an initial step of attempting to negotiate acceptable terms with the current directory service.

8. A method as in claim 1, wherein the step of initiating the search procedure comprises steps of initializing the list of directory service agents with default information and clearing the list of matching software agents, and selecting the current directory service agent from the initialized list of directory service agents.

9. A method as in claim 1, wherein the software agent comprises a directory service agent, wherein the step of initiating the search procedure comprises steps of initializing the list of directory service agents and the list of matching software agents with information maintained by the directory service agent, and selecting the current directory service agent from the initialized list of directory service agents.

10. A method as in claim 1, wherein there are a plurality of directory service agents, and wherein a first directory service agent contacts a second directory service agent with a request to list the first directory service agent, the request comprising listing information.

11. A method as in claim 1, wherein there are a plurality of directory service agents, and wherein a first directory service agent contacts a second directory service agent with a solicitation to list the second directory service agent, and wherein the second directory service agent accepts or refuses the solicitation, and where an acceptance comprises listing information.

12. A method as in claim 1, wherein there are a plurality of directory service agents, and wherein a first directory service agent indirectly contacts a second directory service agent, via a third directory service agent, with a request to list the first directory service agent.

13. A method as in claim 1, wherein there are a plurality of directory service agents, and wherein a first directory service agent indirectly contacts a second directory service agent, via a third directory service agent, with a solicitation to list the second directory service agent.

14. A data communications system comprising a communications network that couples together processor nodes certain ones of which execute a program for implementing the functionality of at least one of a software agent or a directory service agent, wherein the program operates so as to initiate a search procedure for at least one of other software agents or directory service agents, to determine whether to query a current directory service agent for a list of other software agents that match at least one search criterion, and responsive to determining to query the current directory service agent, to query the current directory service agent for the list of other software agents that match at least one search criterion, to add any new matching software agents to a list of matching software agents, to determine whether to query a current directory service agent for a list of other directory service agents, responsive to determining to query the current directory service agent for a list of other directory service agents, to query the current directory service agent for the list of other directory service agents, to add any new directory service agents to a list of directory service agents and to selectively one of terminate the search procedure or to select from the list of directory service agents another directory service agent as the current directory service agent, and to continue this process until the search procedure is terminated.

15. A system as in claim 14, wherein the program, when determining whether to query a current directory service agent for a list of other software agents, considers at least one of a current content of the list of matching software agents, on information concerning the current directory service agent, on resources so far expended on the search, and on available resources.

16. A system as in claim 14, wherein the program, when determining whether to query a current directory service agent for a list of other directory service agents, considers at least one of a current content of the list of matching software agents, characteristics of the entries in the list of matching software agents, on resources so far expended on the search, on available resources, and on a number of directory service agents that have already been queried.

17. A system as in claim 14, wherein the program, when querying the current directory service agent for the list of other software agents, attempts to negotiate acceptable terms with the current directory service.

18. A system as in claim 14, wherein the program, when querying the current directory service agent for the list of other directory service agents, attempts to negotiate acceptable terms with the current directory service.

19. A system as in claim 14, wherein the program, when initiating the search procedure, initializes list of directory service agents with default information, clears the list of matching software agents and selects the current directory service agent from the initialized list of directory service agents.

20. A system as in claim 14, wherein the program implements a directory service agent and, when initiating the search procedure, initializes the list of directory service agents and the list of matching software agents with information maintained by the directory service agent, and selects the current directory service agent from the initialized list of directory service agents.

21. A system as in claim 14, wherein there are a plurality of directory service agents, and wherein a first directory service agent contacts, through said communications network, a second directory service agent with a request to list the first directory service agent, the request comprising listing information.

22. A system as in claim 14, wherein there are a plurality of directory service agents, and wherein a first directory service agent contacts, through said communications network, a second directory service agent with a solicitation to list the second directory service agent, and wherein the second directory service agent accepts or refuses the solicitation, and where an acceptance comprises listing information.

23. A system as in claim 14, wherein there are a plurality of directory service agents, and wherein a first directory service agent indirectly contacts, through said communications network, a second directory service agent, via a third directory service agent, with a request to list the first directory service agent.

24. A system as in claim 14, wherein there are a plurality of directory service agents, and wherein a first directory service agent indirectly contacts, through said communications network, a second directory service agent, via a third directory service agent, with a solicitation to list the second directory service agent.

* * * * *